(12) United States Patent
Bratz et al.

(10) Patent No.: US 9,582,553 B2
(45) Date of Patent: Feb. 28, 2017

(54) SYSTEMS AND METHODS FOR ANALYZING EXISTING DATA MODELS (75) Inventors: Silvia Bratz, Walldorf (DE); Klaus Nagel, Heidelberg (DE); Christel Rueger, Hanau (DE)

(73) Assignee: SAP SE, Walldorf (DE)

( * ) Notice: Subject to any disclaimer, the term of this patent is extended or adjusted under 35 U.S.C. 154(b) by 771 days.

(21) Appl. No.: 13/533,683

(22) Filed: Jun. 26, 2012

(65) Prior Publication Data

US 2013/0346429 A1 Dec. 26, 2013

(51) Int. Cl.
*G06F 7/00* (2006.01)
*G06F 17/00* (2006.01)
*G06F 17/30* (2006.01)

(52) U.S. Cl.
CPC .. *G06F 17/30557* (2013.01); *G06F 17/30303* (2013.01); *G06F 17/30533* (2013.01)

(58) Field of Classification Search
None
See application file for complete search history.

(56) References Cited

U.S. PATENT DOCUMENTS

| 8,510,339 | B1* | 8/2013 | Bair et al. | 707/791 |
| 2005/0102325 | A1* | 5/2005 | Gould et al. | 707/104.1 |
| 2005/0160102 | A1* | 7/2005 | Abdo et al. | 707/100 |
| 2008/0294676 | A1* | 11/2008 | Faerber et al. | 707/102 |
| 2010/0205128 | A1* | 8/2010 | Nolan | G06F 17/30702 706/13 |
| 2012/0173517 | A1* | 7/2012 | Lang et al. | 707/722 |
| 2013/0091120 | A1* | 4/2013 | Ganjam | G06F 17/30303 707/714 |

\* cited by examiner

*Primary Examiner* — Jaau-Shya Meng
(74) *Attorney, Agent, or Firm* — Fountainhead Law Group PC (57) ABSTRACT A computer-implemented method comprising receiving a user request. The method analyzes the data in a plurality of data sets to find inconsistent mappings. Data of data sets, such as columns formed by a join condition, are compared to determine matching or non-matching distinct characteristic values. A composite data set is generated based on the comparison. Another data set is compared with the composite data set, and the composite data set is enhanced. Each data set is compared in sequence, if the composite data set is not empty, until all data sets are analyzed. A result set is generated based on the matching or non-matching distinct characteristic values. The method may also determine if a join operates as a data filter. The operations that are used for analysis may include 'count distinct', 'intersection' and 'Boolean operators'.

20 Claims, 12 Drawing Sheets

| Calendar Year / Month | Customer (Key) | Net Sales |
|---|---|---|
| 2011.11 | King | 20,000 |
| 2011.11 | Queen | 30,000 |
| 2011.11 | Princess | 10,000 |
| 2011.11 | Farmer | 5,000 |
| 2011.11 | Jack | 3,000 |

Fig. 3

| Customer (Key) | ABC Rating |
|---|---|
| King | A |
| Queen | B |
| Princess | C |
| Jack | C |

*Fig. 4*

| Rate | Value |
|------|-------|
| A | 100 |
| B | 10 |
| C | 1 |
| D | 999 |

| Customer | ABC Rating | Value | Calender Year / Month | Net Sales |
|---|---|---|---|---|
| King | A | 100 | 2011.11 | 20,000 |
| Princess | C | 1 | 2011.11 | 10,000 |
| Jack | C | 1 | 2011.11 | 3000 |

SYSTEMS AND METHODS FOR ANALYZING EXISTING DATA MODELS

BACKGROUND

The present invention relates to computing, and in particular, to systems and methods for analyzing existing data models.

In business, academics, and government, data is often stored in different databases that may be in one or more computers in various locations. The databases may be generated by different sources. Valuable insight into the data is usually gained by combining data sets from the different sources, e.g. by combining sales, delivery and invoice data.

Various database software applications have tools available for defining combinations of data sets by logical relationships. One problem associated with these tools is the difficulty of using these tools by a user that has no or little technical background in query and database management programming. The user also needs a very good understanding of the data and metadata (e.g., data types) of the different data sets in order to combine the data sets for creating a consistent model and to understand the result set of the created model. This limits the group of users to a few experts. Consequently, there exists a need for improved systems and methods for analyzing the data of combined-data sets.

SUMMARY

Embodiments of the present invention include systems and methods for analyzing existing data models. In one embodiment, the present invention includes a computer-implemented method comprising receiving a user request in a controller, wherein a data store stores data as a plurality of data sets, each data set comprising a plurality of fields and a plurality of data elements, and wherein each field is associated with a portion of data elements, and wherein the user request associates selected data sets and a field of the selected data sets. The method further includes comparing, by the controller, a first data set of the plurality of data sets and a second data set of the plurality of data sets based on fields and selected data sets associated with the user request.

In one embodiment, the user request includes a user-defined join operation. The first data set is a composite result set of a union of the first data set. The second data set is a data set to be joined based on the user request.

In one embodiment, the method further comprises determining distinct values of data elements of the first data set and the second data set based on the fields associated with the user request; determining intersections of data elements of the first data set and the second data based on the fields associated with the user request; and generating a composite result set based on the determined intersections and distinct values of the first data set and the second data set.

In one embodiment, the method further comprises if the composite data set is not empty, comparing, by the controller, another data set and the composite data set based on fields associated with the user request; and determining distinct values of data elements of said other data set and the composite data set based on the fields associated with the user request.

In one embodiment, the method further comprises repeating for each joined data set of the group of data sets, if the composite data set is not empty, said comparing, said determining distinct values, said determining intersections, said enhancing the composite data result set.

In one embodiment, the method further comprises generating data model display information based on the composite data result set.

In one embodiment, the method further comprises determining whether the join operations operate as a filter.

In another embodiment, the present invention includes a computer readable medium embodying a computer program for performing a method and embodiments described above.

In another embodiment, the present invention includes a computer system comprising one or more processors implementing the techniques described herein. For example, the system includes a controller that receives a user request. A data store stores data as a plurality of data sets. Each data set comprises a plurality of fields and a plurality of data elements. Each field is associated with a portion of data elements. The user request associates a group of data sets and a field of the group of data sets. The controller compares a first data set of the group of data sets and a second data set of the group of data sets based on fields associated with the user request. The controller determines distinct values of data elements of the first data set and the second data set based on the fields associated with the user request. The controller determines intersections of data elements of the first data set and the second data based on the fields associated with the user request. The controller generates a result set based on the determined intersections and distinct values of the first data set and the second data set.

The following detailed description and accompanying drawings provide a better understanding of the nature and advantages of the present invention.

DETAILED DESCRIPTION

Described herein are techniques for analyzing existing data models. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
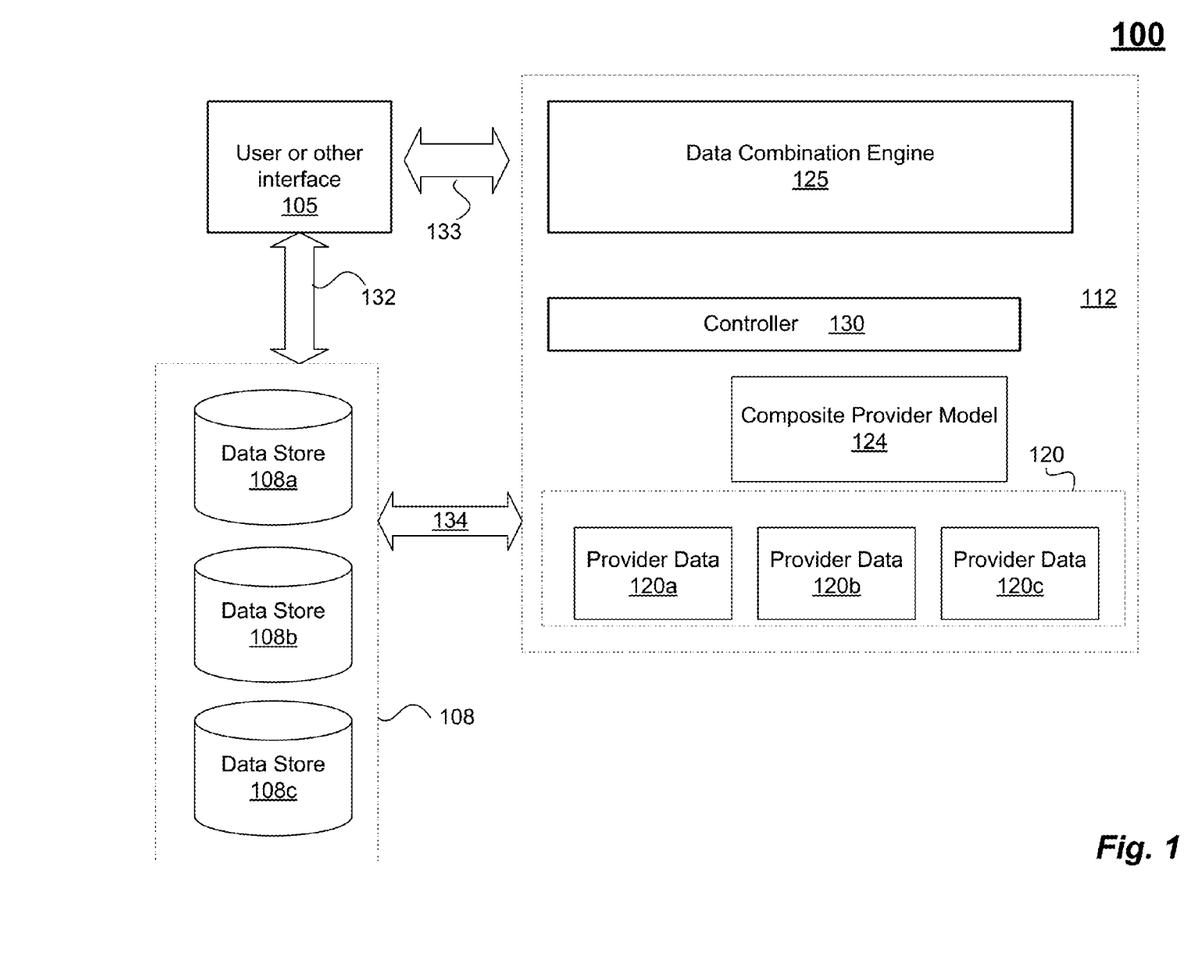
FIG. 1 is a schematic representation of a system for performing analyzing existing data models according to an embodiment of the present invention.

FIG. 1 is a schematic representation of a system 100 for combining existing data models and performing combination analysis according to an embodiment of the present invention. System 100 includes a user or other interface 105, a data store 108, and a data combination system 112. In the following description, the term "data store" is used interchangeably with "database." Data store 108 may comprise one or more data stores. For clarity and simplicity, only three data stores (i.e., data stores 108a, 108b, and 108c) are shown. Data combination system 112 comprises a data store 120 that includes provider data 120a, provider data 120b, and provider data 120c, a composite provider model 124, a data combination engine 125, and a controller 130.

Information is conveyed between user interface 105, data store 108, and data combination system 112, along data flow paths 132, 133, and 134. For example, data combination system 112 accesses the contents of database 108 over data flow path 134 when combining data.

Provider data 120a, 120b, and 120c are sets of data that are stored in database 108 and accessed by data combination system 112. For clarity and simplicity, only three provider data 120 (i.e., provider data 120a, 120b, and 120c) are shown. For example, provider data 120a, 120b, and 120c may be stored in separate databases 108a, 108b, and 108c, respectively. Provider data 120 is a set of data that is stored in database 108.

Composite provider model 124 is a model of combinations of data sets from provider data 120. In some embodiments, the combination is a union or join operation (such as inner join) of data sets. Data combination engine 125 executes a process or algorithm that analyzes data from provider data 120a, 120b, and 120c and generates composite provider model 124 based on the analysis. Data combination engine 125 analyzes various properties of the data sets for generating the composite provider model 124. Data combination engine 125 combines data from database 108 using the analysis of the properties, and generates and provides composite provider model 124 to user interface 105.

User or other interface 105 is a collection of one or more data input/output devices for interacting with a human user or with another data processing system to receive and output data. For example, interface 105 can be a presentation system, one or more software applications, or a data communications gateway, for example. Data flow path 132 is data communicated over interface 105 that retrieves data from or causes a change to data stored in database 108. Such changes include the insertion, deletion, or modification of all or a portion of the contents of database 108. Data output over interface 105 can present the results of data processing activities in system 100. For example, data flow path 133 can convey the results of queries or other operations performed on data combination system 112 for presentation on a monitor or a data communications gateway.

Data store 108 is a collection of information that is stored at one or more data machine readable storage devices (e.g., data stores). Data store 108 may be a single data store or multiple data stores, which may be coupled to one or more software applications for storing application data. Data store 108 may store data as a plurality of data records. Each data record comprises a plurality of data elements (e.g., fields of a record). Data store 108 may include different structures and their relations (e.g., data store tables, data records, fields, and foreign key relations). Additionally, different structures and fields may include data types, descriptions, or other metadata, for example, which may be different for different data records. Data flow path 134 conveys information describing changes to data stored in data store 108 between data combination system 112 and data store 108 Such changes include the insertion, deletion, and modification of all or a portion of the contents of one or more data stores.

Data combination system 112 is a collection of data processing activities (e.g., one or more data analysis programs or methods) performed in accordance with the logic of a set of machine-readable instructions. The data processing activities can include combining or analyzing on the contents of data store 108 based on a user request. The results of such requests can be aggregated to yield an aggregated result set. A user request may be a request for information or perform an operation, such as combining selected data sets or user specified data sets. A result set is a set of information formed by analyzing data sets. An aggregated result set is a set of information from a data store that responds to a user request, such as from data store 108. The set of information in an aggregated result set can be, for example, a union of the results of independent operations on two or more data sets. The aggregated result sets can be conveyed to interface 105 over data flow path 133. Interface 105 can, in turn, render the aggregated result sets over an output device for a human or other user or to other systems. This output of aggregated result sets drawn from data combination system 112, based on data from data store 108, allows system 100 to accurately portray the combination of different data sets.

User requests or requests from the data combination engine 125 or the user interface 105 may be received by controller 130. Controller 130 may be a component on the same system as a data store or part of a different system and may be implemented in hardware, software, or as a combination of hardware and software, for example. Controller 130 receives a request from data combination engine 125 and generates one or more requests based on the received request depending on the data stores 108 and data sets that are to be accessed. Data store 108 transforms the request from controller 130 into a request syntax (e.g., SQL) compatible with the data store, and the request may specify specific tables and fields to be read from the data store.

Controller 130 receives data from data store 108. In responding to the request from data combination engine 125, controller 130 may aggregate the data of the data sets from data store 108. The aggregation may be implemented with a join operation, for example. Finally, controller 130 returns the aggregated data to data combination engine 125 in response to the request.

Figure 2:
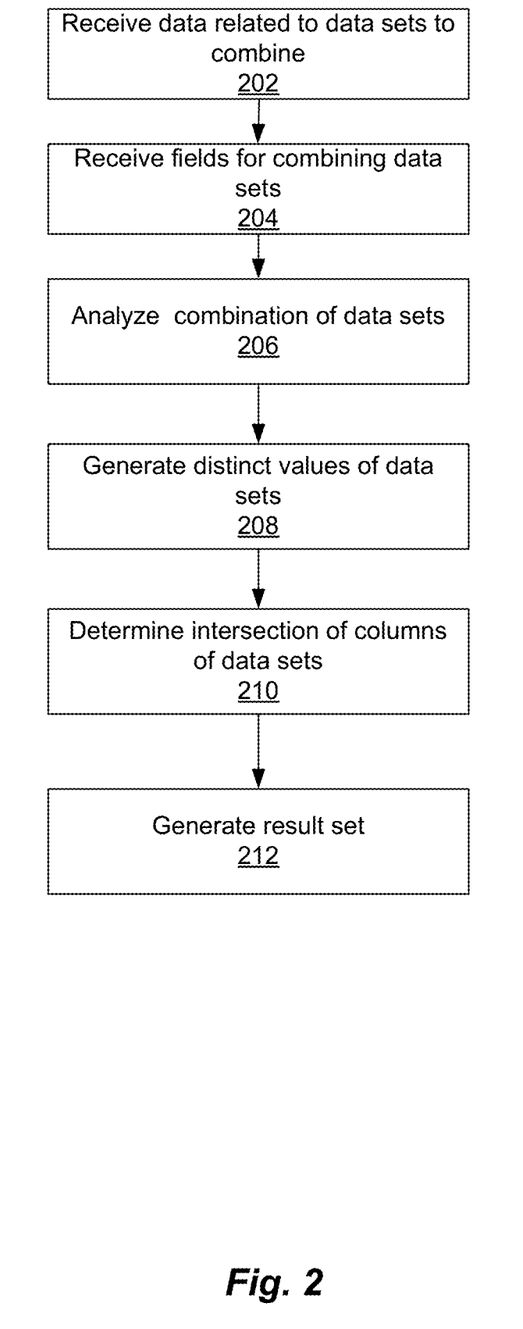
FIG. 2 illustrates a process for analyzing data sets according to an embodiment of the present invention.

FIG. 2 illustrates a process for combining data sets according to an embodiment of the present invention. The process illustrated in FIG. 2 is described using the example data sets illustrated in FIGS. 3-5, which are example tables for provider data 120a, 120b, and 120c, respectively.

Figure 3:
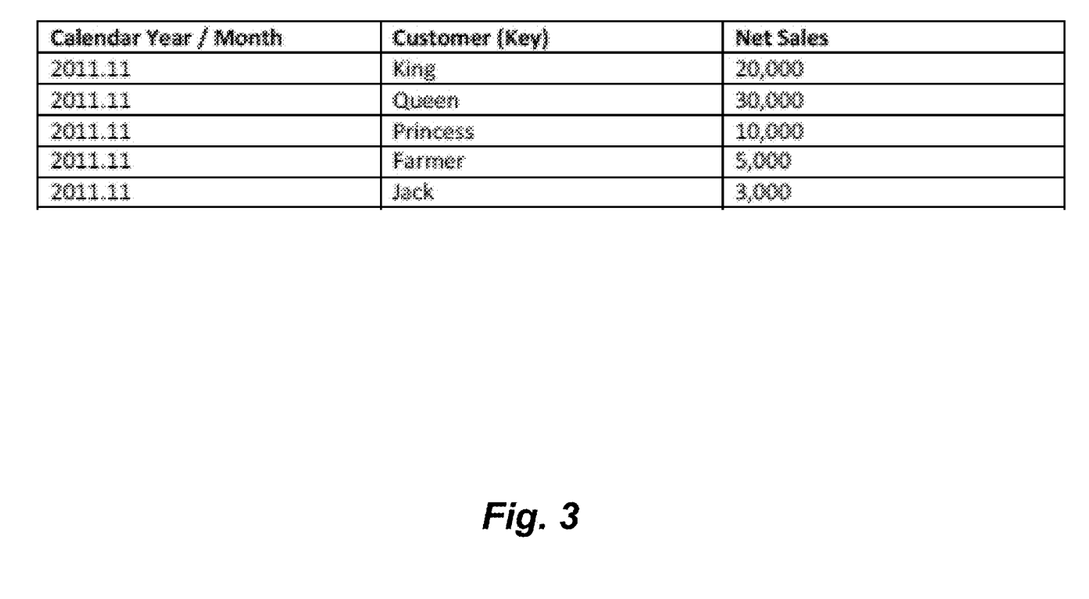
FIG. 3 illustrates example table values for a provider data store.

FIG. 3 illustrates example table data for provider data 120a, which may be maintained and stored in database 108a, for example. The table has a granularity that includes calendar year/month, customer identification (key), and net sales.

Figure 4:
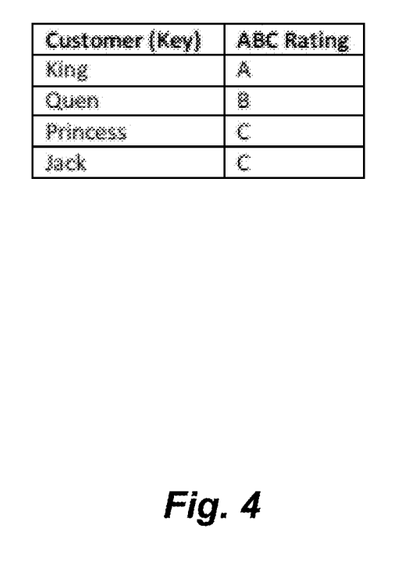
FIG. 4 illustrates example table values for another provider data store.

FIG. 4 illustrates example table data for provider data 120b, which may be maintained and stored in database 108b, for example. The table has a granularity that includes customer (key) and rating. The data entry "Quen" is a typographical error for the word "Queen" which is a data entry in the table of FIG. 3.

Figure 5:
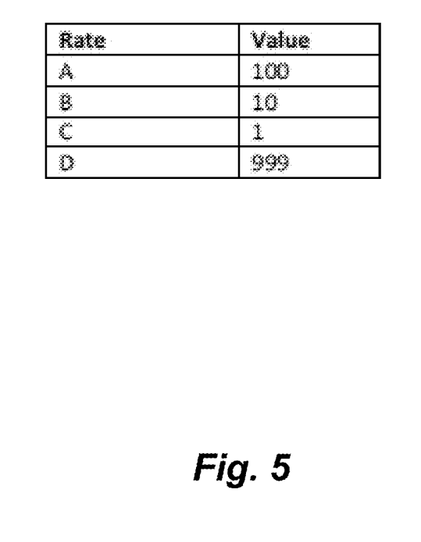
FIG. 5 illustrates example table values for yet another provider data store.

FIG. 5 illustrates example table data for provider data 120c, which may be maintained and stored in database 108c, for example. The table has a granularity that includes rating and rating value.

Referring again to FIG. 2, at 202, data combination engine 125 receives data related to the data sets of database 108 that are to be combined. For example, the data sets may be provider data 120a, 120b, and 120c. At 204, data combination engine 125 receives identifiers of the fields that are to be combined. The fields may be, for example, customer, rating, and value. At 206, data combination engine 125 analyses various combinations of data sets based on the received fields. For example, data combination engine 125 analyzes combinations of provider data 120a, 120b, and 120c based on the customer, rating, and value fields. As will be described in conjunction with FIG. 6, data combination engine 125 compares a pair of provider data 120, and then on subsequent comparisons, compares another provider data 120 to the combined (e.g., UNION) previously compared provider data 120. The comparisons continue until there is no intersection between provider data 120 or the last provider data 120 has been analyzed. At 206, data combination engine 125 generates distinct values of the data sets. For example, data combination engine 125 generates distinct values of the provider data 120a, 120b, and 120c. The distinct values may be generated using a count distinct operation. At 210, data combination engine 125 determines the intersection of columns of provider data 120a, 120b, and 120c for the selected fields. For example, data combination engine 125 determines the intersection of the columns for the customer, rating, and value fields for provider data 120a, 120b, and 120c.

Figure 11:
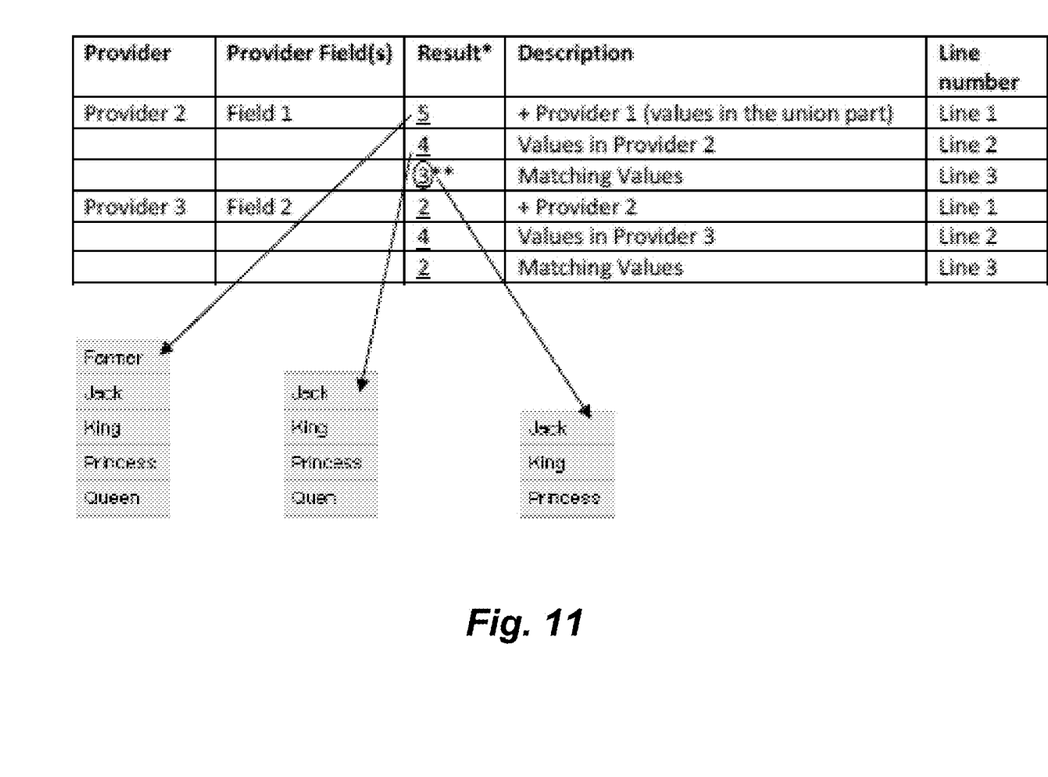
FIG. 11 illustrates example table values of a result set according to an embodiment of the present invention.

At 212, data combination engine 125 generates a result set from the distinct values and intersection of the columns as will be described in more detail below in conjunction with FIG. 11. The model shows differences or discrepancies between the joined or associated fields of the data sets. The model also indicates the number of distinct values of all join field combinations of previously analyzed providers with respect to the provider data 120 that is being examined. The model also indicates the number of distinct values of all join field combinations with respect to the provider data 120 that is being examined. The model also indicates the number of matches in the data. If the number of values of the joint combination is greater than the number of matching values, the data is different between the data sets. The difference may be, for example, an inconsistency or intentionally omitted data. The user can select from user interface 105 to view the distinct values, various combinations, and matches. Using standard database tools, the user may modify the provider data 120 to correct or otherwise change the data entry. For example, the user may correct the spelling of "Quen". Running data combination engine 125 again results in an additional matching value between provider data 120a and 120b that reflects the corrected spelling. The user may decide that the omission of Farmer is intentional and ignore it, or may decide that the omission is an error, and take corrective action, such requesting a change of the data in provider data 120b.

Figure 6:
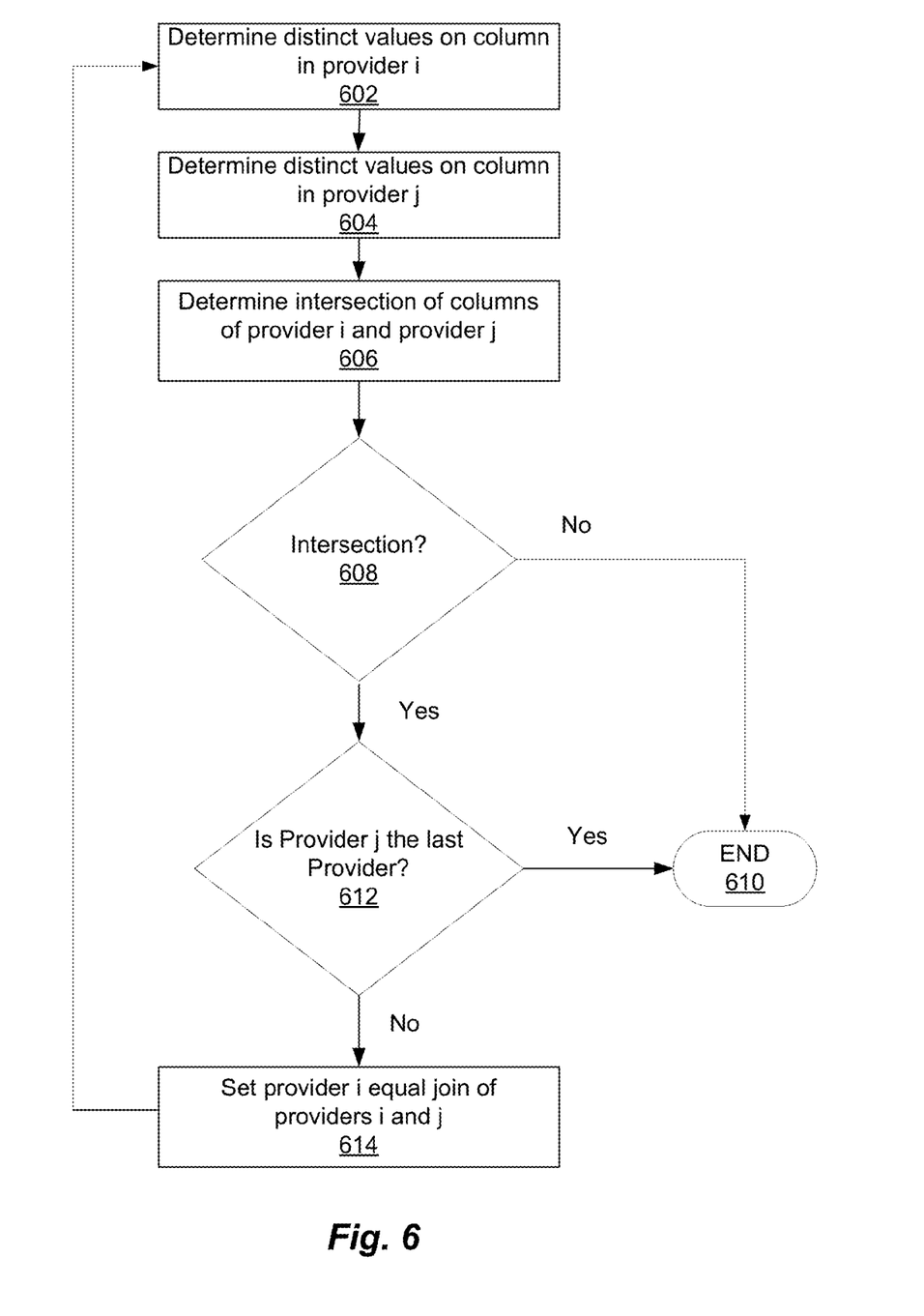
FIG. 6 illustrates a process for analyzing data sets according to an embodiment of the present invention.

FIG. 6 illustrates a process for combining data sets according to an embodiment of the present invention. The process illustrated in FIG. 6 is described using the example data illustrated above in FIGS. 3-5, the example data set linking of FIG. 7, and the example table of FIG. 8. The combination functions or logical relationships described herein for various embodiments are described in terms of SQL operations, such as UNION, INNER JOIN and (LEFT) OUTER JOIN, as illustrative examples. For ease of explanation, provider i and provider j will be used to refer to two of provider data 120. The process illustrated in FIG. 6 may be used for two or more providers and may continue until each provider is analyzed or the composite data set is empty.

Figure 7:
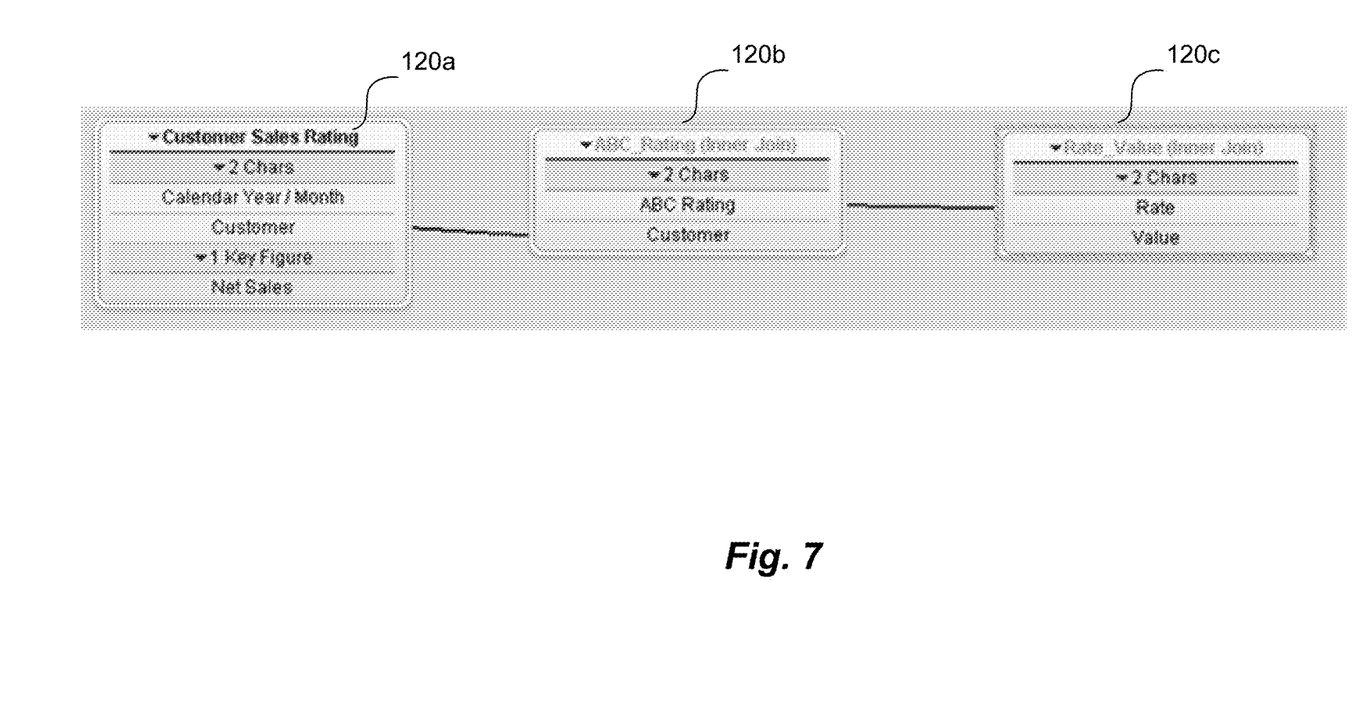
FIG. 7 illustrates example data set linking.

At 602, data combination engine 125 determines distinct values in provider i on the JOIN column. As an illustrative example for the first iteration of i, FIG. 7 illustrates provider 120a as customer sales rating with a customer field. Data combination engine 125 determines distinct values in the customer field of provider 120a. In the illustrative table of FIG. 3, data combination engine 125 finds five distinct values, namely, King, Queen, Princess, Farmer, and Jack.

At 604, data combination engine 125 determines distinct values in provider j on the JOIN column. As an illustrative example for the first iteration of j, FIG. 7 illustrates provider 120b as customer sales rating with a customer field. Data combination engine 125 determines distinct values in the customer field of provider 120b. In the illustrative table of FIG. 4, data combination engine 125 finds four distinct values, namely, King, Quen, Princess, and Jack. As noted above, data entry Quen is a typographical error. Entry Farmer is missing, which may be intentional or in error.

Figure 8:
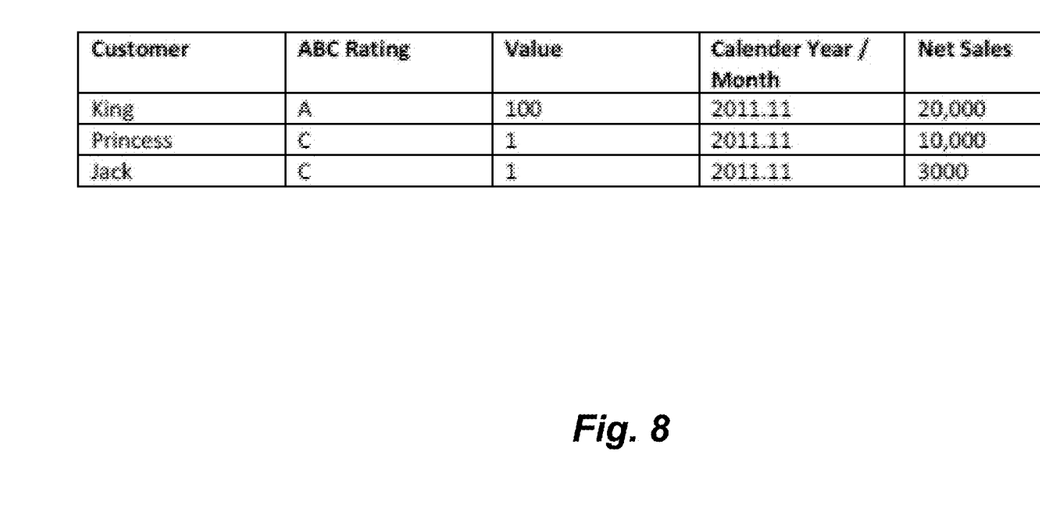
FIG. 8 illustrates example table values for combined data sets.
Figure 9:
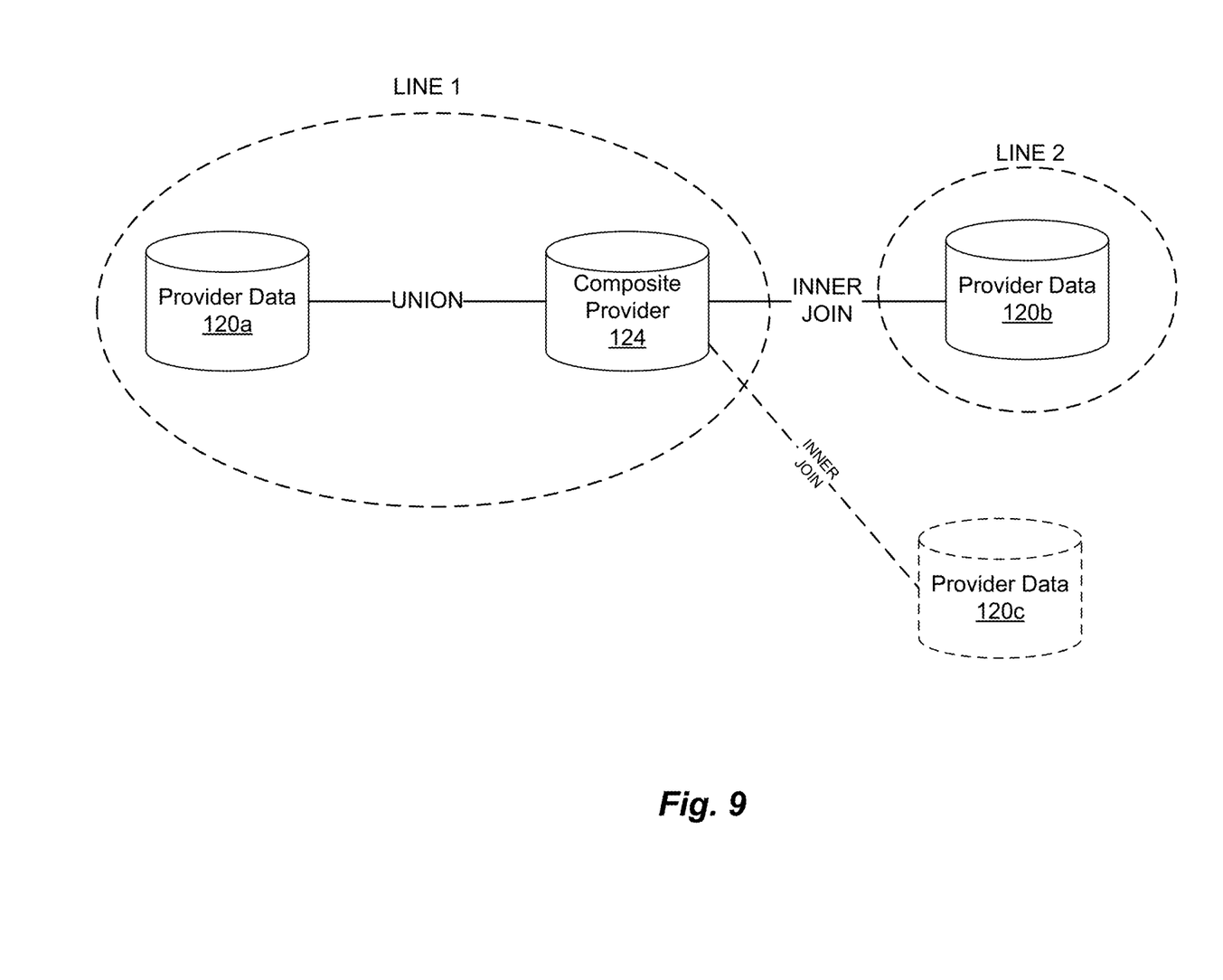
FIG. 9 illustrates combination operations of provider data store according to an embodiment of the present invention.

At 606, data combination engine 125 determines the intersection of the JOIN columns of provider i and provider j. In the illustrative embodiment, the intersection is an INNER JOIN. The result is three customers, namely King, Princess and Jack. FIG. 8 is example table data of the intersection of the provider 120a and provider 120b combined with the data of provider 120c. FIG. 8 shows only the matching data values. This data does not include Queen (Quen in provider 120b), because of the typographical error, and does not include Farmer, which may or may not be intentionally omitted from provider 120b. As will be described below, the distinct values determined at 602 and 604, but not part of the intersection (Queen and Farmer), will be provided to allow the user to determine whether the non matching data should be included. FIG. 9 illustrates the intersection determination at 606 for provider 120a and provider 120b. The notation Line 1 and Line 2 indicate the placement of the data in a results table described below in conjunction with FIG. 11.

At 608, data combination engine 125 determines whether the intersection at 606 is zero. If it is, at 610, data combination engine 125 ends the join analysis and generates the model of results as described at 212 (FIG. 2). Otherwise, at 612, data combination engine 125 determines whether the provider 120 (provider j) being analyzed is the last provider. If it is, at 610, data combination engine 125 ends the join analysis. In the first iteration provider j is provider 120b, and provider 120c remains to be analyzed.

Figure 10:
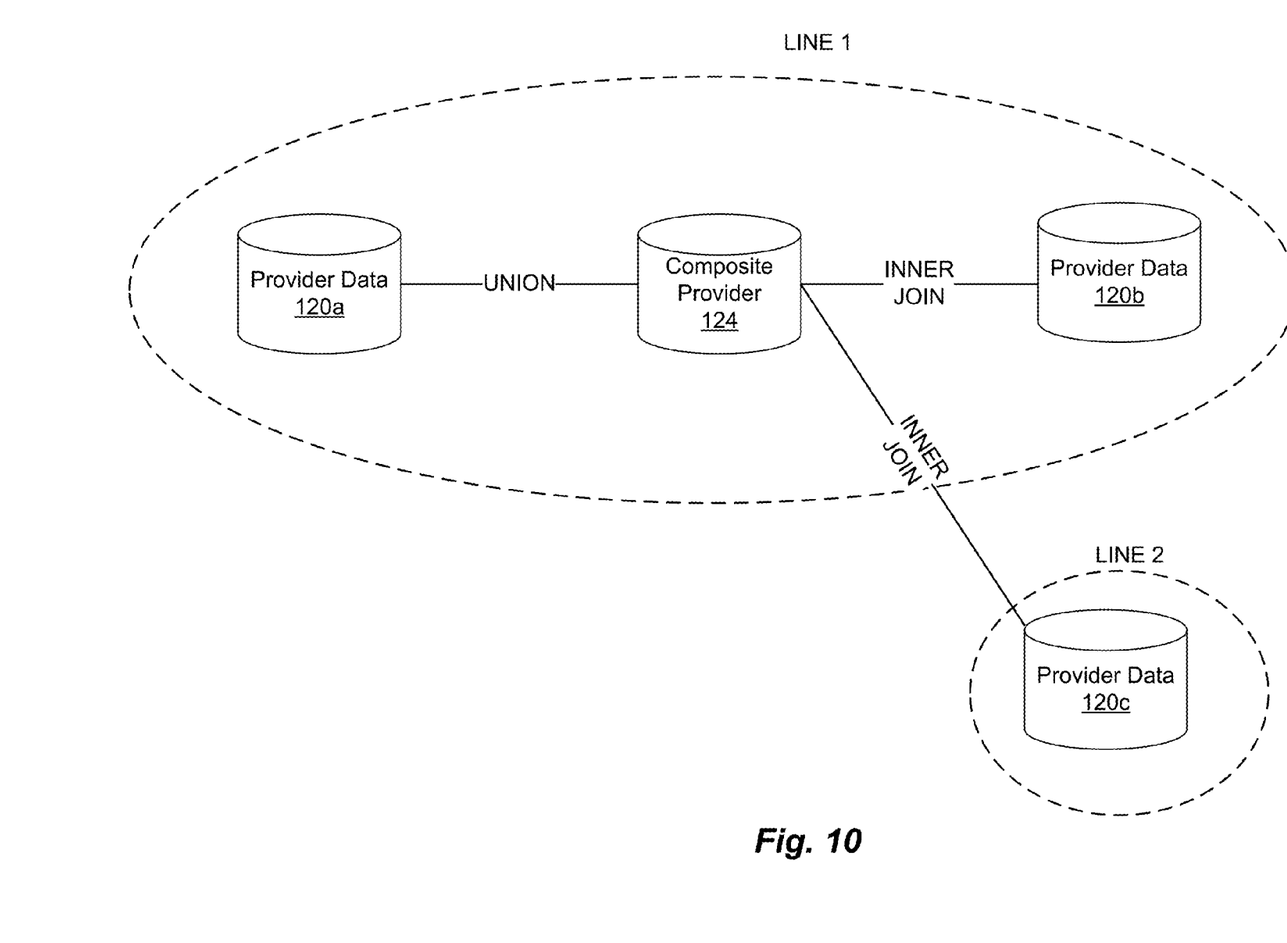
FIG. 10 illustrates combination operations of provider data store according to another embodiment of the present invention.

At 614, data combination engine 125 defines provider i as the join combination of provider i and provider j, and returns to analyzing provider i at 602. In the illustrative example, provider i (i equals 1) equals (provider 120a JOIN provider 120b). The provider i at 614 is a composite data set that is modified with each iteration, as shown in FIGS. 9-10.

In the second iteration, at 602, data combination engine 125 determines distinct values in provider 120a (the join at 614) on the JOIN column, namely customer rating. In the illustrative table of FIG. 4, data combination engine 125 finds two distinct values, namely, a rating A for King, and a rating C for Princess and Jack.

At 604, data combination engine 125 determines distinct values in provider 120c on the JOIN column. FIG. 7 illustrates provider 120c as rating value with a customer rate. Data combination engine 125 determines distinct values in the customer rate field of provider 120c. In the illustrative table of FIG. 5, data combination engine 125 finds four distinct values, namely, A, B, C, and D. Rating B and D are not matching due to the inner JOIN operation.

At 606, data combination engine 125 determines the intersection of provider 120c JOIN with the JOIN of provider 120a and provider 120b. In the illustrative embodiment, the intersection is ratings A and C. FIG. 8 illustrates the value for the ratings of A and C. As will be described below, the distinct values determined at 602 and 604, but not part of the intersection (ratings B and D), will be provided to allow the user to determine whether non matching data should be ignored or corrected. FIG. 10 illustrates the intersection determination at 606 for provider 120c and the JOIN of provider 120a and provider 120b. The notation Line 1 and Line 2 indicate the placement of the data in a results table described below in conjunction with FIG. 11.

At 608, data combination engine 125 determines whether the intersection at 606 is zero. In this example, it is not zero and at 612, data combination engine 125 determines whether the provider (provider j) that is analyzed is the last provider. Provider 120c (for j=3) is the last provider, and thus data combination engine 125 ends the join analysis.

Referring again to FIG. 2, at 212, data combination engine 125 generates the result set. FIG. 11 illustrates example table data of the result set of the analysis. FIG. 11 illustrates for providers 120b and 120c, the fields of the combination, the number of values of the result, a description of the value and a corresponding line number. The combination of the customer field (called field 1 in FIG. 11) illustrates that the union of provider 120a and 120b has five distinct values (line 1) expanding to show in a pop up window (Farmer, Jack, King, Princess, and Queen). Provider 120b has four distinct values (line 2) expanding to show in a pop up window (Jack, King, Princess, and Quen) and three distinct matching values (line 3) expanding to show in a pop up window (Jack, King. and Princess). The combination of the customer field (called field 2 in FIG. 11) illustrates that the union of provider 120c and the JOIN of providers 120a and 120b has two different values (line 1), which could be expanded to show in a pop up window (A and C). Provider 120c has four different values (line 2), which could be expanded to show in a pop up window (A, B, C and D) and two values matching (line 3), which could be expanded to show in a pop up window (A and C). As described above, the user may use the result set to determine whether the non matching values should be ignored or corrected by requesting a change to provider data 120.

Data combination engine 125 may also determine whether the join operates as a filter. A join operates as a filter, if the join type is inner, and the difference (line 1 minus line 3) is greater than zero (>0) (thus, not all values match; and the join operates as filter). A join does not operate as a filter, if the join type is left outer, or the difference (Line 1 minus Line 3) is zero (=0) (thus, all values match; and the join does not operate as filter).

Figure 12:
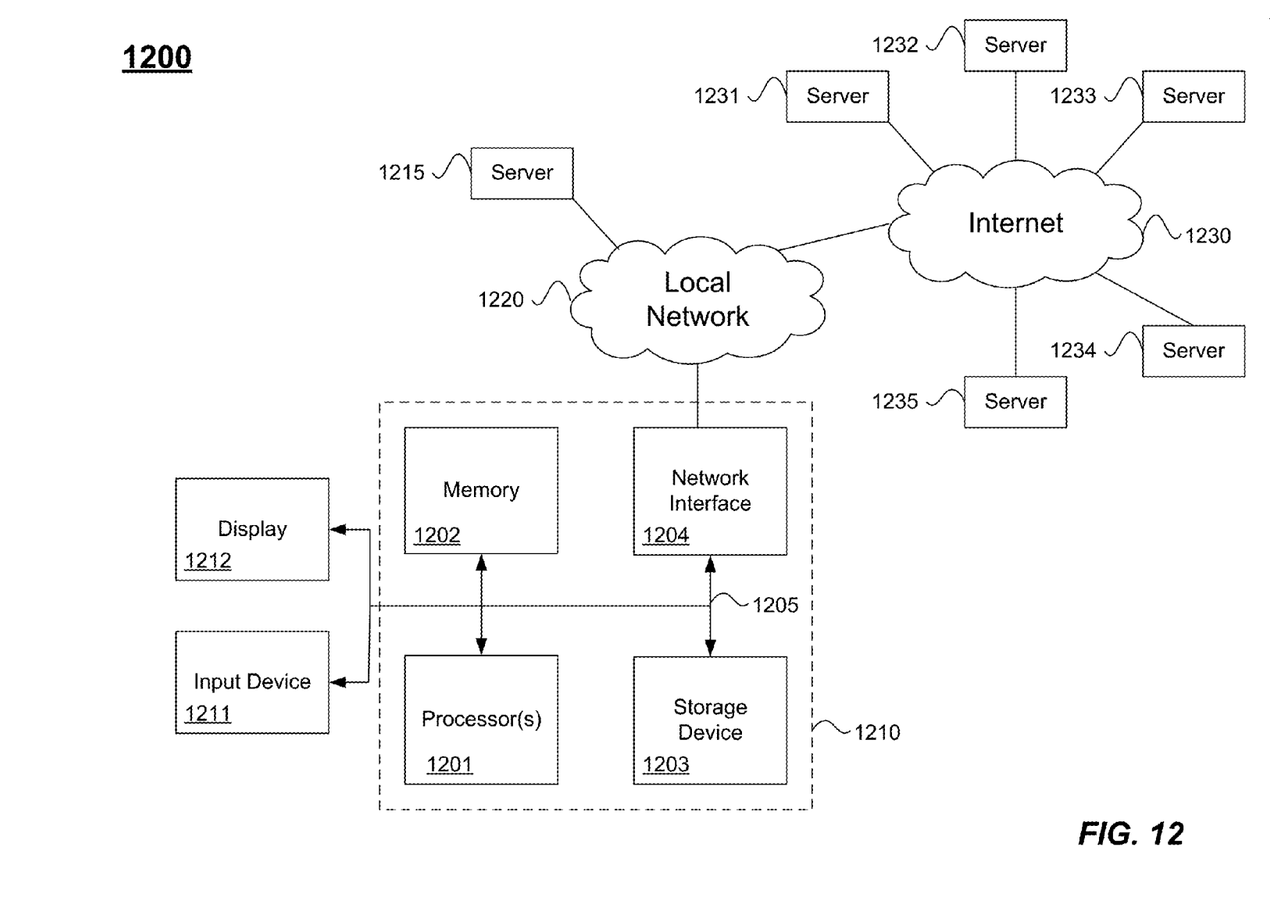
FIG. 12 illustrates hardware used to implement embodiments of the present invention.

FIG. 12 illustrates hardware used to implement embodiments of the present invention. An example computer system 1210 is illustrated in FIG. 12. Computer system 1210 includes a bus 1205 or other communication mechanism for communicating information, and one or more processors 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A machine readable storage device 1203 is also provided for storing information and instructions. Common forms of storage devices include, for example, a non-transitory electromagnetic medium such as a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device 1203 and memory 1202 are both examples of computer readable mediums.

Computer system 1210 may be coupled via bus 1205 to a display 1212, such as a cathode ray tube (CRT), plasma display, light emitting diode (LED) display, or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system, and may include, for example, user interface 105. In some systems, bus 1205 may be divided into multiple specialized buses.

Computer system 1210 also includes a network interface 1204 coupled with bus 1205. Network interface 1204 may provide two-way data communication between computer system 1210 and the local network 1220, for example. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may be programmed with processes described herein. In the Internet example, software components or services may reside on multiple different computer systems 1210 or servers 1231-1235 across the network. Some or all of the processes described above may be implemented on one or more servers, for example. Specifically, data store 108 and data combination system 112 might be located on different computer systems 1210 or one or more servers 1215 and 1231-1235, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving, by a processor, a user request,
      wherein a data store stores data as a plurality of data sets, each data set comprising a plurality of fields and a plurality of data elements, and wherein each field is associated with a portion of the data elements, and wherein the user request specifies a first field of a first data set in the plurality of data sets and a second field of a second data set in the plurality of data sets;
   comparing, by the processor, data elements associated with the first field of the first data set of the plurality of data sets;
   determining, by the processor, a first set of distinct values of data elements associated with the first field of the first data set based on the comparison of the data elements associated with the first field of the first data set;
   comparing, by the processor, data elements associated with the second field of the second data set of the plurality of data sets;
   determining, by the processor, a second set of distinct values of data elements associated with the second field of the second data set based on the comparison of the data elements associated with the second field of the second data set;
   presenting, by the processor, through a user interface, a first list comprising the first set of distinct values and a second list comprising the second set of distinct values in response to the user request;
   receiving, by the processor, an instruction through the user interface to correct a typographical error associated with a first distinct value of a data element from the first data set;
   modifying the first distinct value of the data element in the first data set to match a second distinct value of a data element from the second data set in response to the instruction;
   determining, by the processor, a set of intersections of the first set of distinct values of data elements of the first data set that includes the modified first distinct value of the data element and the second set of distinct values of data elements of the second data set; and
   generating, by the processor, a result set based on the determined set of intersections.

2. The computer-implemented method of claim 1, wherein the user request includes a user-defined joined operation, wherein the first data set is a composite result set of a union of a third data set in the plurality of data sets and a fourth data set in plurality of data sets, wherein the second data set is a data set to be joined based on the user request.

3. The computer-implemented method of claim 1, further comprising generating, by the processor, data model display information based on the result set.

4. The computer-implemented method of claim 1, wherein the set of intersections is a first set of intersections, the method further comprising:
   generating, by the processor, a composite data set based on the first set of determined intersections of the first set of distinct values of data elements of the first data set and the second set of distinct values of data elements of the second data set;
   performing, by the processor, the following upon determining that the composite data set is not empty:
   comparing another data set in the plurality of data sets and the composite data set based on a third field of said another data set and a fourth field of the composite data set;
   determining a third set of distinct values of data elements in the third field of said another data set and a fourth set of distinct values of data elements in the fourth field of the composite data set;
   determining a second set of intersections of the third set of distinct values of data elements of the first data set and the fourth set of distinct values of data elements of the fourth data set;
   modifying the result set based on the second set of determined intersections; and
   modifying the composite data set based on the second set of determined intersections of data elements of said another data set and the composite data set.

5. The computer-implemented method of claim 4, further comprising generating, by the processor, data model display information based on the result set.

6. The computer-implemented method of claim 4, further comprising repeating the following for each data set of the group of data sets, upon determining that the composite data set is not empty:
   said comparing, said determining distinct values, said determining intersections, said modifying the result set and said modifying the composite data set.

7. The computer-implemented method of claim 4, wherein generating the result set further comprises determining, by the processor, distinct values of a join operation of said another data set and the composite data set.

8. The computer-implemented method of claim 4, wherein generating the result set further comprises:
   determining, by the processor, a total of the distinct values of each data set,
   determining, by the processor, a total of the matching values of the set of intersections and
   determining, by the processor, a values in a join between compared data sets.

9. The computer-implemented method of claim 4 wherein the second set of intersections of said another data set and the composite data set are based on join operations.

10. The computer-implemented method of claim 9, further comprising determining, by the processor, whether the join operations operate as a filter.

11. A non-transitory computer readable medium embodying a computer program for performing a method, said method comprising:
    receiving a user request in a controller,
       wherein a data store stores data as a plurality of data sets, each data set comprising a plurality of fields and a plurality of data elements, and wherein each field is associated with a portion of the data elements, and wherein the user request specifies a first field of a first data set in the plurality of data sets and a second field of a second data set in the plurality of data sets;

comparing data elements associated with the first field of the first data set of the plurality of data sets;

determining a first set of distinct values of data elements associated with the first field of the first data set based on the comparison of the data elements associated with the first field of the first data set;

comparing data elements associated with the second field of the second data set of the plurality of data sets;

determining a second set of distinct values of data elements associated with the second field of the second data set based on the comparison of the data elements associated with the second field of the second data set;

presenting, through the user interface, a first list comprising the first set of distinct values and a second list comprising the second set of distinct values in response to the user request;

receiving an instruction through the user interface to correct a typographical error associated with a first distinct value of a data element from the first data set;

modifying the first distinct value of the data element in the first data set to match a second distinct value of a data element from the second data set in response to the instruction;

determining a set of intersections of the first set of distinct values of data elements of the first data set that includes the modified first distinct value of the data element and the second set of distinct values of data elements of the second data set; and generating a result set based on the set of determined intersections.

12. The non-transitory computer readable medium of claim 11, wherein the method further comprises generating data model display information based on the result set.

13. The non-transitory computer readable medium of claim 12, wherein the set of intersections is a first set of intersections, wherein the method further comprises:

generating a composite data set based on the first set of determined intersections of the first set of distinct values of data elements of the first data set and the second set of distinct values of data elements of the second data set;

performing the following upon determining that the composite data set is not empty:

comparing, by the controller, another data set in the plurality of data sets and the composite data set based on a third field of said another data set and a fourth field of the composite data set;

determining a third set of distinct values of data elements in the third field of said another data set and a fourth set of distinct values of data elements in the fourth field of the composite data set;

determining a second set of intersections of the third set of distinct values of data elements of the first data set and the fourth set of distinct values of data elements of the fourth data set;

modifying the result set based on the second set of determined intersections; and modifying the composite data set based on the second set of determined intersections of data elements of said another data set and the composite data set.

14. The non-transitory computer readable medium of claim 12, wherein generating the result set further comprises determining a number of distinct values of each data set, a number of matching values of the second set of intersections and number of values in a join between compared data sets.

15. The non-transitory computer readable medium of claim 11 wherein the intersections are join operations.

16. The non-transitory computer readable medium of claim 15, further comprising determining whether the join operations operate as a filter.

17. The non-transitory computer readable medium of claim 11, wherein the data sets are arranged in columns of data elements, and a field is associated with a column.

18. A computer system comprising:

a processor;

a memory to store instructions, the instructions executed by the processor to perform:

receiving a user request in a controller, wherein a data store stores data as a plurality of data sets, each data set comprising a plurality of fields and a plurality of data elements, and wherein each field is associated with a portion of the data elements, and wherein the user request specifies a first field of a first data set in the plurality of data sets and a second field of a second data set in the plurality of data sets;

comparing data elements associated with the first field of the first data set of the plurality of data sets;

determining a first set of distinct values of data elements associated with the first field of the first data set based on the comparison of the data elements associated with the first field of the first data set;

comparing data elements associated with the second field of the second data set of the plurality of data sets second field of the second data set;

determining a second set of distinct values of data elements associated with the second field of the second data set based on the comparison of the data elements associated with the second field of the second data set;

presenting, through a user interface, a first list comprising the first set of distinct values and a second list comprising the second set of distinct values in response to the user request;

receiving an instruction through the user interface to correct a typographical error associated with a first distinct value of a data element from the first data set;

modifying the first distinct value of the data element in the first data set to match a second distinct value of a data element from the second data set in response to the instruction;

determining a set of intersections of the first set of distinct values of data elements of the first data set that includes the modified first distinct value of the data element and the second set of distinct values of data elements of the second data set; and generating a result set based on the set of determined intersections.

19. The computer system of claim 18, wherein the controller further generates generating data model display information based on the result set.

20. The computer system of claim 19, wherein the set of intersections is a first set of intersections, wherein the controller further performs the following upon determining that the composite data set is not empty:

compares another data set in the plurality of data sets and the composite data set based on a third field of said another data set and a fourth field of the composite data set, determining a third set of distinct values of data elements in the third field of said another data set and a fourth set of distinct values of data elements in the fourth field of the composite data set, determining a second set of intersections of the third set of distinct values of data elements of the first data set and the fourth set of distinct values of data elements of the fourth data set, modifying the result set based on the second set of determined intersections, and modifies the composite data set based on the second set of determined intersections of data elements of said another data set and the composite data set.

\* \* \* \* \*